United States Patent [19]

Kralles

[11] Patent Number: 5,111,241
[45] Date of Patent: May 5, 1992

[54] BERNOULLI SCAN GATE

[75] Inventor: Christopher J. Kralles, Rochester, N.Y.

[73] Assignee: Eastman Kodak Company, Rochester, N.Y.

[21] Appl. No.: 750,377

[22] Filed: Aug. 27, 1991

[51] Int. Cl.⁵ .............................................. G03B 27/62
[52] U.S. Cl. ..................................... 355/75; 162/271; 352/222
[58] Field of Search .......................... 355/50, 75, 76; 209/906; 406/198; 162/270, 271; 353/69; 352/222

[56] References Cited

U.S. PATENT DOCUMENTS

| | | | |
|---|---|---|---|
| 3,103,850 | 9/1963 | Khoury et al. | 355/76 |
| 3,402,638 | 9/1968 | Hutchison, Jr. | 353/69 |
| 3,922,086 | 11/1975 | Freericks | 355/76 |
| 3,970,385 | 7/1976 | Kearney et al. | 355/50 |
| 4,026,653 | 5/1977 | Appelbaum et al. | 355/132 |
| 4,059,260 | 11/1977 | Stange et al. | 355/50 X |
| 4,097,146 | 6/1978 | Sasamori | 355/75 |
| 4,380,389 | 4/1983 | Kingsley | 355/50 |
| 4,666,293 | 5/1987 | Kingsland et al. | 355/75 |
| 4,768,068 | 8/1988 | Partilla | 355/75 |

OTHER PUBLICATIONS

IBM Technical Disclosure Bulletin entitled "Document Transport" by R. K. Wilmer, vol. 4, No. 10, Mar. 1962.

Primary Examiner—Richard A. Wintercorn
Attorney, Agent, or Firm—Ronald Reichman

[57] ABSTRACT

A web flattening system for holding a filmstrip (web) or filmstrip and paper carrier combination (web) against the aperture of a linear array scanner. The foregoing is accomplished by providing: a platen having at least two orifices over which the bottom surface of a web moves; a plate that is positioned above the top surface of the web and the platen so that the bottom surface of the web will be positioned in close proximity to the orifices; and means for supplying a high velocity gas stream to the orifices so that a pressure differential will exist between the top and bottom surfaces of the web; whereby the pressure differential will push the bottom surface of the web towards the orifices and a thin layer of gas will form between the bottom surface of the web and the platen.

3 Claims, 3 Drawing Sheets

BERNOULLI SCAN GATE

BACKGROUND OF THE INVENTION

1. Field of the Invention

The invention relates generally to the field of photography and particularly to a system for holding a filmstrip against a platen of a photographic printer.

2. Descriotion of the Prior Art

Photographic printers use film negatives to make prints. Most photographic printers contain a linear array scanning station. As each frame of the filmstrip (negatives) pass over the aperture of the linear array scanning station, devices contained within the photographic printer scan each filmstrip frame. The devices obtain information about the density, color balance and composition of each frame of the filmstrip so that the photographic printer may use this information to adjust various photographic printer parameters to produce better quality prints.

In order to obtain the above information, the filmstrip has to be placed flat over the aperture of the linear array scanning station. The prior art utilized tension gates or deflectors to hold the film flat against the aperture of the scanning station and drive rollers to move the filmstrip over the aperture of the scanning station. The deflectors pushed the filmstrip against the aperture plate of the scanning station and the drive rollers moved the filmstrip past the aperture and pushed the filmstrip against the deflectors. The interaction of the filmstrip with the deflectors and aperture plate caused tension in the filmstrip or web. If the tension in the filmstrip exceeded the frictional drive capabilities of the drive rollers, the filmstrip would slip relative to the drive rollers rotation. When the above happened, the photographic printer would not meter the filmstrip correctly and the correct frame would not appear at the aperture of the scanner. Sometimes, the drive rollers exerted a large amount of force on the filmstrip, which caused the filmstrip to break. The foregoing caused at least one negative to be damaged, the loss of some photographic paper and the printer to stop processing film until the filmstrip could be respliced. Thus, one of the disadvantages of the above prior art system was that tensions in the filmstrip caused the system to malfunction.

Another disadvantage of the above prior art system was that sometimes the deflectors scratched the picture portion of the filmstrip and damaged the quality of the resulting prints.

Another prior art system utilized a clamping arrangement to keep the filmstrip flat against a plate of a scanner that had an aperture and drive rollers to move the filmstrip past the aperture of the plate. The clamping system was essentially a four-sided picture frame with a hole in the middle. The drive rollers would move the filmstrip between the aperture of the plate and the four-sided picture frame. As each frame of the filmstrip passed over the aperture of the plate, the four-sided frame was actuated and pushed the filmstrip against the aperture of the plate. Thus, for every frame that moved past the aperture of the plate, the four-sided frame moved down and up.

One of the disadvantages of the above system was that the system was slow, since time was required to move the frame down and up.

Another disadvantage of the above system was that the system had additional moving parts, which had a tendency to become inoperative.

In order to make photographic printers more efficient during reorder operation, the various frames of the filmstrip that a customer wanted reprinted were attached to a paper carrier. The paper carrier formed a roll containing many frames that were able to be rapidly moved through the printer. Whereas, if the filmstrip was not connected to a paper carrier individual frames on a four-frame filmstrip would have to be moved separately through the printer. The above deflectors and clamping system caused additional tension in the filmstrip and paper carrier which caused the filmstrip and paper carrier combination to delaminate. Oftentimes the printer was not able to print frames of the filmstrip that were not connected to the paper carrier. Sometimes the increased tension caused the paper carrier and/or filmstrip to break, which caused the printer to be shut down until the paper carrier was reattached to the filmstrip. Thus, the above deflectors and clamping systems had additional problems when the photographic printers were printing reordered filmstrips.

SUMMARY OF THE INVENTION

The present invention overcomes the disadvantages of the prior art, by providing a filmstrip flattening system that holds a filmstrip against the aperture of a linear array scanner without increasing the tension in the filmstrip. The reduction in tension in the filmstrip (web) or filmstrip and paper carrier combination (web) reduces the tension across the drive rollers. Thus, the drive rollers will have less filmstrip slippage, less filmstrip/paper carrier slippage, less filmstrip breakage and less filmstrip/paper carrier breakage. Hence, the use of the filmstrip flattening system of this invention will result in less photographic printer down time. Therefore, the photographic printer will operate more efficiently than prior art photographic printers.

The foregoing is achieved by providing:

a platen having at least two orifices over which the bottom surface of a web moves;

a plate that is positioned above the top surface of the web and the platen so that the bottom surface of the web will be positioned in close proximity to the orifices; and means for supplying a high velocity gas stream to the orifices so that a pressure differential will exist between the top and bottom surfaces of the web; whereby the pressure differential will push the bottom surface of the web towards the orifices and a thin layer of gas will form between the bottom surface of the web and the platen.

DESCRIPTION OF THE PREFERRED EMBODIMENT

Figure 1:
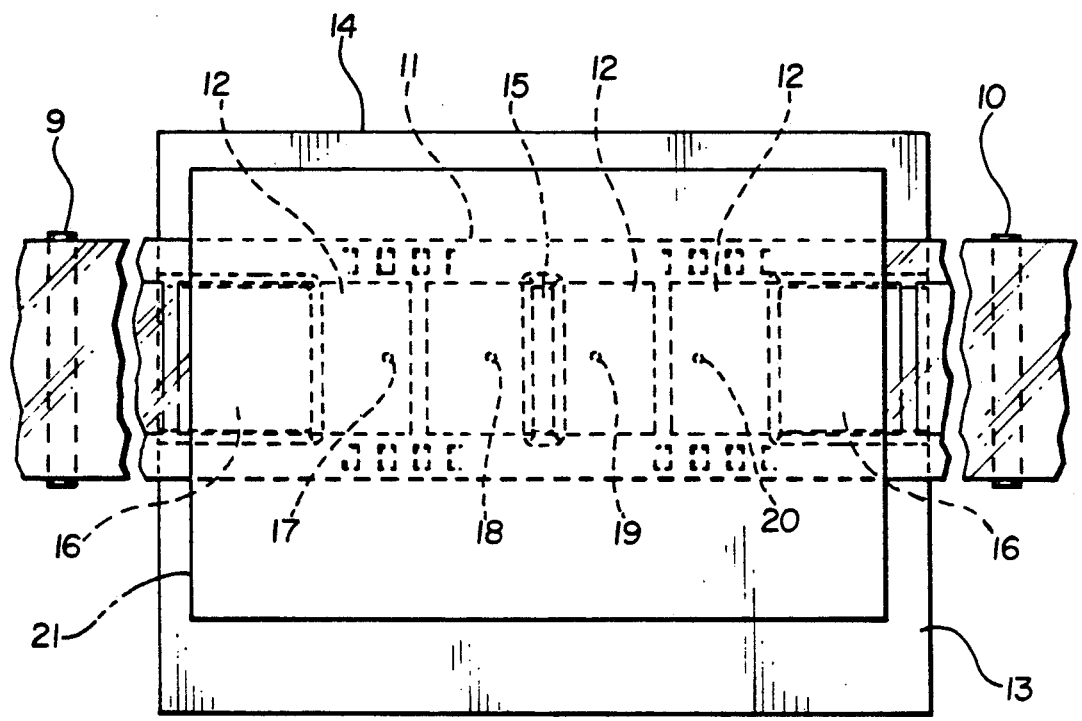
FIG. 1 is a diagram that illustrates a filmstrip passing over the aperture of a linear array scanning station.

Referring now to the drawings in detail, and more particularly to FIG. 1, the reference character 11 represents a filmstrip or web that contains a plurality of frames 12. Filmstrip 11 is placed over platen 13 of linear array scanning station 14. Electronic devices (not shown) are placed in close proximity to aperture 15 of platen 13 to obtain information about frames 12 of filmstrip 11. Rollers (9 and 10) are utilized to move filmstrip 11 over grooves 16 and aperture 15 of platen 13. Orifices 17, 18, 19 and 20 appear in platen 13. Orifices 17 and 18 appear on the left side of aperture 15 and orifices 19 and 20 appear on the right side of aperture 15. Orifices 17 through 20 are positioned perpendicular to the midpoint of aperture 15. Orifices 17 through 20 are between .01 inches and 0.06 inches in diameter.

Orifices 17 through 20 are connected to laboratory shop air tank 22 by tube 23. The manner in which tank 22 is connected to orifices 17 through 20 will be described in the description of FIG. 2. Tank 22 has a flow rate of approximately 8 scfm (standard cubic feet per minute). With this flow rate, the air moving through orifices 17 through 20 will have a high velocity. The air moving above filmstrip 11 will be at atmospheric pressure and will have a low velocity.

The apparatus of this invention utilizes Bernoulli's principle to flatten filmstrip 11 in the vicinity of aperture 15. Bernoulli's principle may be stated as follows:

$$\tfrac{1}{2}dV_1^2 + P_1 = \tfrac{1}{2}dV_2^2 + P_2$$

where P = pressure and V = velocity for a given incompressible fluid. From this equation and the description of FIG. 2 it is apparent that as the fluid velocity increases the pressure decreases.

The positive pressure flowing through orifices 17 through 20 escapes beneath filmstrip 11 at a high velocity. As a consequence, the pressure beneath filmstrip 11 near orifices 17 through 20, is less than atmospheric pressure. The pressure above filmstrip 11 is at atmospheric pressure. The unbalanced pressure causes a force to be exerted on filmstrip 11. This force pushes filmstrip 11 flat against aperture 15. Thus, when the velocity of air passing through orifices 17 through 20 is increased, atmospheric pressure will cause filmstrip 11 to be pressed tighter against aperture 15.

The thin layer of high velocity air beneath filmstrip 11 acts as an air bearing, preventing filmstrip 11 from contacting the surface of platen 13. This creates a minimized drag situation, with no direct frictional contact between filmstrip 11 and the surface of platen 13. With filmstrip 11 suspended from the surface of platen 13 filmstrip 11 will not be scratched.

A deflector plate 21 is positioned approximately 0.050 of an inch over platen 13 to insure that filmstrip 11 is positioned in the high air velocity region above orifices 17 through 20.

As the leading edge of a frame 12 of filmstrip 11 rides on the air bearing and passes over orifice 17, the atmospheric pressure will cause a portion of frame 12 to be pushed against platen 13. Rollers (9 and 10) will move the leading edge of frame 12 past orifice 17 and over orifice 18. Two orifices are required to supply sufficient high velocity air to hold frame 12 against platen 13. As the leading edge of frame 12 moves past aperture 15 and over orifice 19, orifices 18 and 19 will be utilized to supply sufficient high velocity air to hold frame 12 against platen 13. When the leading edge of frame 12 moves past orifice 19 and over orifice 20, orifices 19 and 20 will be utilized to supply sufficient high velocity air to hold frame 12 against platen 13. While frame 12 is over aperture 15, frame 12 will be scanned by electronic devices (not shown) to set or adjust various printer parameters.

Figure 2:
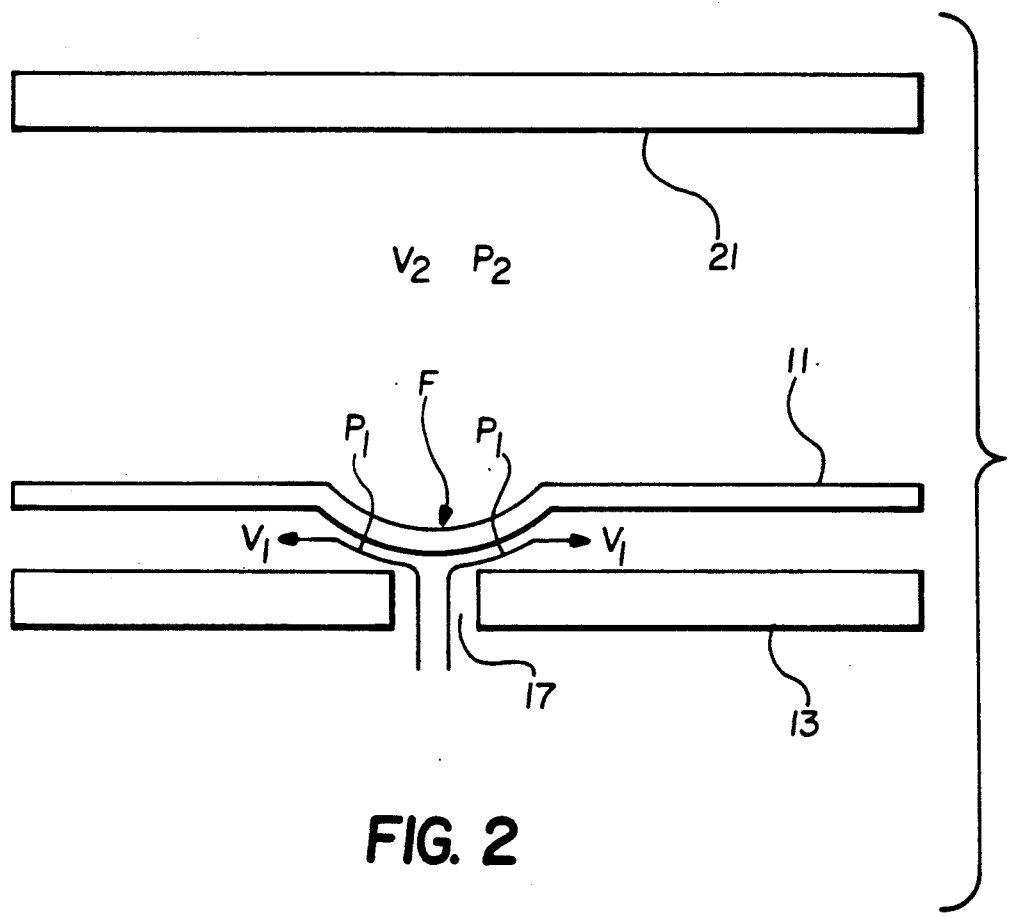
FIG. 2 is a side view of a portion of the scanning station of FIG. 1.

FIG. 2 is a side view of filmstrip 11, orifice 17 of platen 13 and deflection plate 21 of FIG. 1. The air moving through orifice 17 will have a high velocity $V_1$ and a pressure $P_1$. The air moving above filmstrip 11 and below plate 21 will have a velocity $V_2$ and a pressure $P_2$. Pressure $P_2$ will equal atmospheric pressure. Since the distance between platen 13 and plate 21 is approximately 0.050 inches, $V_2$ will be close to zero. Applying Bernoulli's equation $\tfrac{1}{2}dV_1 + P_1 \tfrac{1}{2}dV_2 + P_2$ to the above situation and then solving for $P_1$, $P_1$ will be substantially less than atmospheric pressure. The unbalanced pressure, i.e. ($P_2 - P_1$) causes a force F to be exerted on filmstrip 11. Force F pushes filmstrip 11 towards orifice 17. In a similar manner force F will push filmstrip 11 towards orifices 18, 19 and 20.

Figure 3:
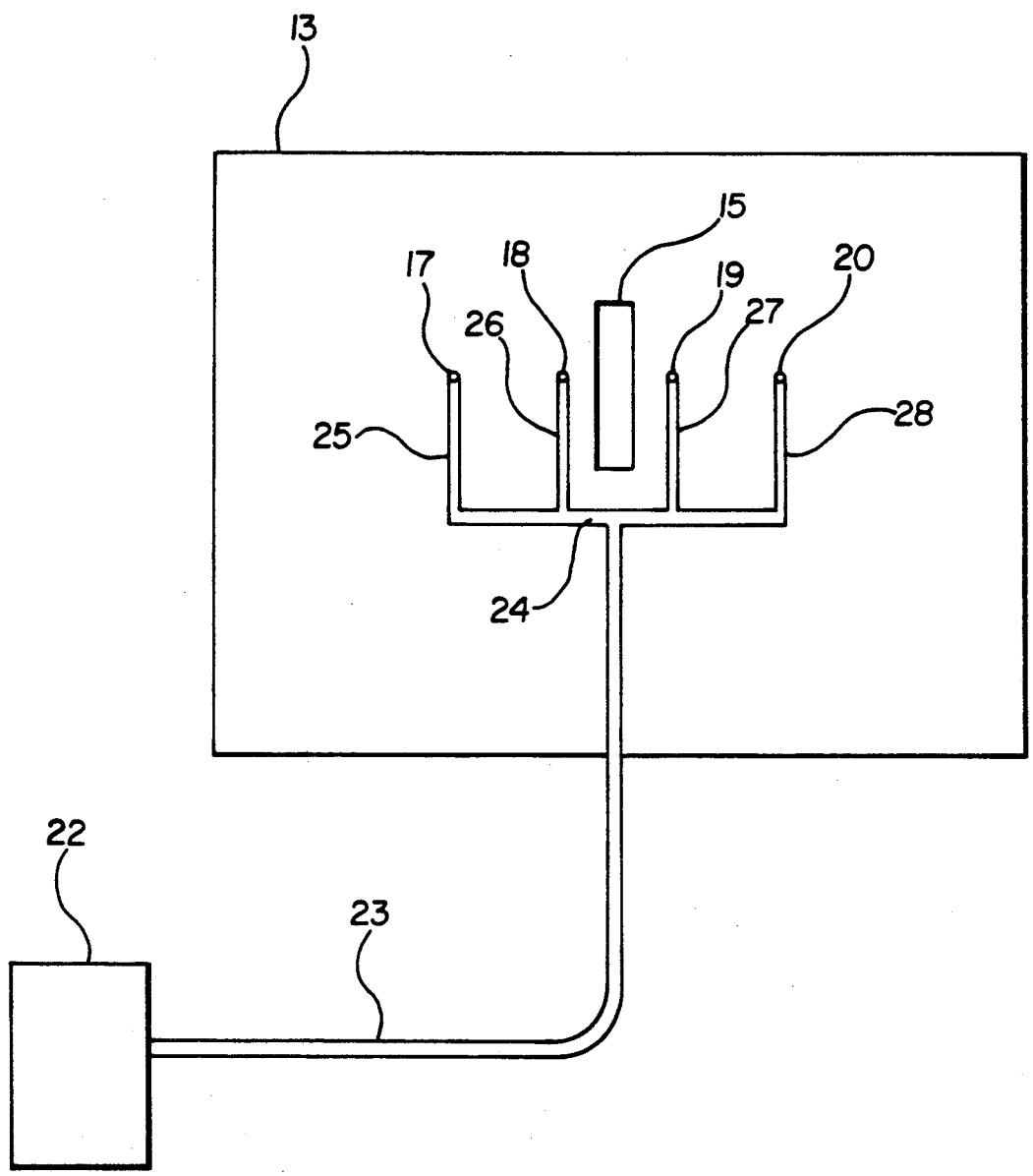
FIG. 3 is a diagram that illustrates the connection of a gas source to the orifices of FIG. 1.

FIG. 3 is a diagram that illustrates the opposite side of platen 13 of FIG. 1. Laboratory air tank 22 has an air flow rate of approximately 8 scfm. Tank 22 is connected to air distribution network 24 by tube 23. Leg 25 of network 24 connects network 24 to orifice 17 and leg 26 of network 24 connects network 24 to orifice 18. Leg 27 of network 24 connects network 24 to orifice 19 and leg 28 of network 24 connects orifice 20 to network 24. Network 24 insures that orifices 17, 18, 19 and 20 will have air having approximately the same velocity.

The above specification has described a new and improved system for holding a filmstrip or a filmstrip and paper carrier combination against a platen of a photographic printer. It is realized that the above description may indicate to those skilled in the art additional ways in which the principles of this invention may be used without departing from its spirit. It is, therefore, intended that this invention only be limited by the scope of the appended claims.

What is claimed is:

1. A web flattening system for a web having a top surface and a bottom surface, said system comprises:

a platen having at least two orifices;

a plate positioned above said platen in close proximity to cause the bottom surface of a web moved between said plate and said platen to be positioned in close proximity to said orifices; and means for supplying a high velocity gas stream to said orifices to create lesser gas pressure along the bottom surface of a web moved between said plate and said platen than the ambient gas pressure along the top surface of the web, whereby the web will be shifted toward said platen at least in the vicinity of said orifices.

2. The system claimed in claim 1, wherein said platen has an imaging window positioned between said orifices.

3. A web flattening system for a web having a top surface and a bottom surface, said system comprises:

a first plate having an imaging window and high velocity gas jet orifices on either side of said window;

means for moving the bottom surface of a web over said window and said orifices in close proximity to said orifices and said window;

a second plate positioned above said platen in close proximity to cause the bottom surface of the moving web to be in close proximity to said orifices; and means for supplying gas to said orifices to create lesser gas pressure along the bottom surface of a web moved between said plate and said platen than the ambient gas pressure along the top surface of the web, whereby, the web will be shifted toward said platen at least in the vicinity of said orifices.

* * * * *

UNITED STATES PATENT AND TRADEMARK OFFICE
CERTIFICATE OF CORRECTION

PATENT NO. : 5,111,241
DATED : May 5, 1992
INVENTOR(S) : Kralles

It is certified that error appears in the above-identified patent and that said Letters Patent is hereby corrected as shown below:

Col. 1, Line 10  "Descriotion" should be deleted and insert --Description--

Col. 3, Line 24  Delete "$1/2dV_1^1 + P_1$" and insert --$1/2dV_1^2 + P_1$--

Col. 4, Line 7  Should read "Applying Bernoulli's equation $1/2dV_1^2 + P_1 = 1/2dV_2^2 + P_2$"

Signed and Sealed this

Twenty-fourth Day of August, 1993

Attest:

BRUCE LEHMAN

Attesting Officer      Commissioner of Patents and Trademarks